C. F. DAVIS.
Harvester Rake.
No. 54,871.
Patented May 22, 1866.
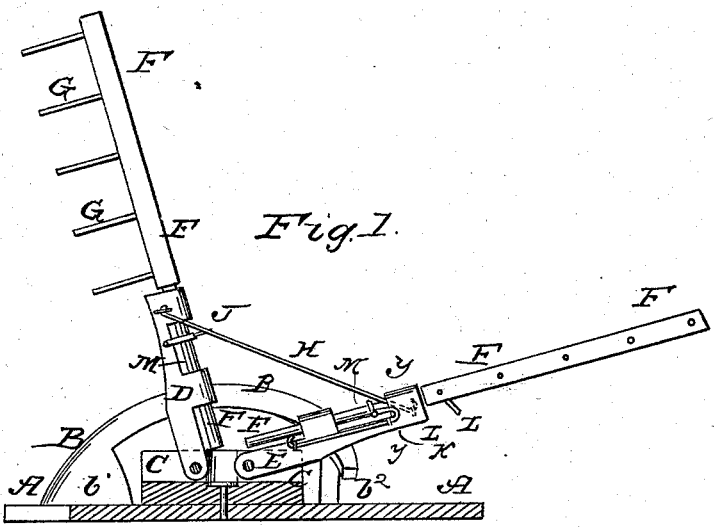
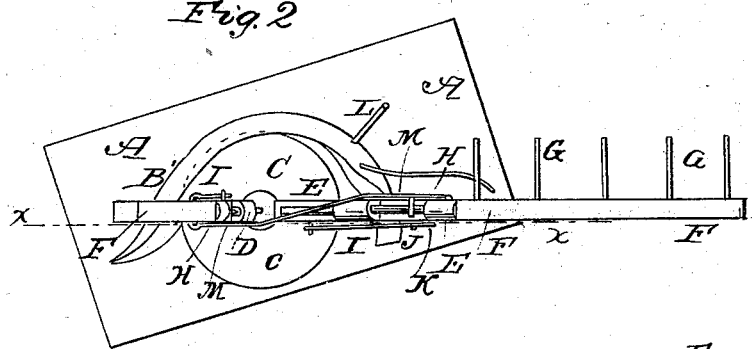
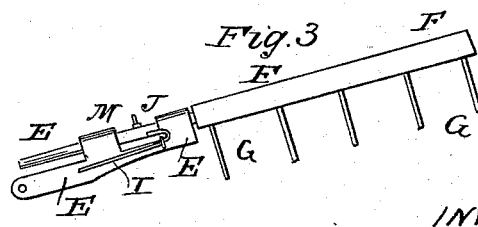
WITNESSES
INVENTOR

UNITED STATES PATENT OFFICE.

CHARLES F. DAVIS, OF AUBURN, NEW YORK.

IMPROVEMENT IN HARVESTER-RAKES.

Specification forming part of Letters Patent No. 54,871, dated May 22, 1866.

*To all whom it may concern:*

Be it known that I, CHARLES F. DAVIS, of Auburn, Cayuga county, State of New York, have invented a new and useful Improvement in Harvester-Rakes; and I do hereby declare that the following is a full, clear, and exact description thereof, which will enable others skilled in the art to make and use the same, reference being had to the accompanying drawings, forming part of this specification, in which—

Figure 1 is a side view of my improved harvester-rake, partly in section, through the line $x\ x$, Fig. 2. Fig. 2 is a top or plan view of the same. Fig. 3 is a detail view of one of the rakes in position for sweeping the platform. Fig. 4 is a detail sectional view taken through the line $y\ y$, Fig. 1.

Similar letters of reference indicate like parts.

My invention has for its object to furnish an improved harvester-rake so constructed that it may be made at will to pass over the platform without removing the grain therefrom, so that the driver may regulate the size of the gavels in cutting uneven grain; and it consists of the combination of lever-springs, latches, and catches with each other and with the rake-heads, arms, and frame or guide, as hereinafter more fully described, for the purpose of enabling the driver at pleasure to revolve the rake-teeth into such a position that they will pass over the platform without coming in contact with the grain that may be thereon.

A represents the platform or part of the harvester to which the rake is attached. B is the frame or guide by which the rakes are guided up so as to pass over the driver and again allowed to descend and act as a reel in holding the grain forward against the cutters and as a rake to sweep the gavels from the platform. The guide B is held up or supported by the supports $b'\ b^2$, as seen in Fig. 1.

C is the revolving support, to which the arms that carry the rake-heads are pivoted. This support C is pivoted to the platform A, as shown in Fig. 1, and the central part of its upper side is hollowed out, as shown, to allow space for the downward projection of the inward ends of the rake-head bars as the rake-head approaches a vertical position in passing along the guide B. The support C is slotted from the central chamber to its outer edge, as shown in Fig. 1, and within these slots are pivoted the lower ends of the arms D and E, that carry the rake-heads. The number of these slots should equal the number of rake-heads intended to be used.

Upon the upper edges of the arms D and E are formed projections, in which are formed the bearings of the rake-head shafts, as shown in Figs. 1, 2, and 3. As the rake revolves the under side of the arms D and E slide along the guide B and raise and lower the rake-heads.

F are the rake-head bars, from one side of the upper end of which the teeth G project, as shown. The lower ends of these bars are rounded off and work in the bearings formed upon the upper side of the arms D and E, as before described. The arms D and E and the rake-heads F are kept at the same distance from each other, and the one is pushed down as the other rises by a bar, H, pivoted to opposite sides of two opposite arms, as shown in Figs. 1 and 2.

I are latches pivoted to the support C, as shown in Figs. 1 and 2, and sliding in keepers attached to the arms D and E as the said arms rise and fall while passing along the guide B. The upper ends of these latches are bent over so as to form hooks, which catch upon catches J and K attached to the lower part of the rake-head bars F, and hold the said rake-heads in the desired position while passing over the platform of the harvester.

L is a lever so placed as to be under the control of the driver, and connected with the guide B. By projecting this lever upward as the rake-heads pass down the guide B the lower tooth of the rake-head will come in contact with the said lever L, and the rake-head will be revolved into the position shown in Figs. 1 and 2, so as pass over the platform without coming in contact with the grain thereon. This revolution brings the catch J into such a position that it catches upon the latch I, and the rake-head is held in that position until it begins to rise at the other end of the guide B. This rise of the rake-head frees the catch J from the latch I and the rake-head is immediately drawn back into its former position by the action of the spring M.

The spring M is attached to the arms D and E at one end and at the other end to the catch J, as represented in the drawings, and may be a rubber spring, as shown in the drawings, or it may be a coiled-wire spring, or any other kind of a spring, provided it is attached to the bar F in such a way as to revolve the rake-head when released from the latch I.

When the rake-head is allowed to pass the lever L without coming in contact therewith the teeth G sweep the gavel from the platform in the ordinary manner. When in this position the rake-head is kept from being revolved by the weight of the grain by the action of the catches K, which catch upon the latches I, as shown in Fig. 3, and hold the rake-head in that position until released by its rise at the other end of the guide B, as before described.

I claim as new and desire to secure by Letters Patent—

The combination, in a harvester-rake, of the lever L, springs M, or equivalent, latches I, and catches J K with each other and with the rake-heads F, arms D E, and frame or guide B, substantially as described, and for the purpose set forth.

CHARLES F. DAVIS.

Witnesses:
JOHN DAVIS,
CORNELIA A. DAVIS.